US007580761B2

(12) United States Patent
Sakurai et al.

(10) Patent No.: US 7,580,761 B2
(45) Date of Patent: *Aug. 25, 2009

(54) FIXED-SIZE CROSS-CORRELATION COMPUTATION METHOD FOR AUDIO TIME SCALE MODIFICATION

(75) Inventors: Atsuhiro Sakurai, Ibaraki (JP); Yoshihide Iwata, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1013 days.

This patent is subject to a terminal disclaimer.

(21) Appl. No.: 10/714,175

(22) Filed: Nov. 14, 2003

(65) Prior Publication Data

US 2005/0038534 A1 Feb. 17, 2005

Related U.S. Application Data

(60) Provisional application No. 60/426,607, filed on Nov. 15, 2002.

(51) Int. Cl.
*G06F 17/00* (2006.01)

(52) U.S. Cl. .......................................................... 700/94

(58) Field of Classification Search .................... 700/94; 708/322

See application file for complete search history.

(56) References Cited

U.S. PATENT DOCUMENTS

2004/0122662 A1 * 6/2004 Crockett .................. 704/200.1

OTHER PUBLICATIONS

Time-Scale Modification of Speed Signals Using Cross-Correlation Functions; Ryoji Suzuki and Masayuki Misaki; IEEE Transactions on Consumer Electronics, vol. 38, No. 3, Aug. 1992.*

Justy W.C. Wong, et al.; *Fast Time Scale Modification Using Envelope-Matching Technique* (*Em-TSM*); Proc. of 1998 IEEE Int'l Symp. On Circuits & Systems (ISCAS), Monterey, CA, Jun. 1998, vol. 5, pp. 550-553.

Salim Roucos, et al.; *High Quality Time-Scale Modification for Speech*, Proc. ICASSP 1985, pp. 493-496.

* cited by examiner

*Primary Examiner*—Andrew C Flanders
(74) *Attorney, Agent, or Firm*—Robert D. Marshall, Jr.; Wade J. Brady, III; Frederick J. Telecky, Jr.

(57) ABSTRACT

A time-domain time-scale modification method based on the synchronous overlap-and-add method consists of a generalization of the envelope-matching time-scale modification method. The cross-correlation function employs a fixed-size cross-correlation buffer to eliminate the need for normalization inside the search loop. This fixed-size cross-correlation buffer is the center of the overlap region corresponding to the case where the fine overlap adjustment value is set to zero. The computational cost of this invention is lower than any other method with a comparable quality.

6 Claims, 3 Drawing Sheets

FIXED-SIZE CROSS-CORRELATION COMPUTATION METHOD FOR AUDIO TIME SCALE MODIFICATION

CLAIM OF PRIORITY

This application claims priority under 35 U.S.C. 119(c) from U.S. Provisional Application 60/426,607 filed Nov. 15, 2002.

TECHNICAL FIELD OF THE INVENTION

The technical field of this invention is digital audio time scale modification.

BACKGROUND OF THE INVENTION

Time-scale modification (TSM) is an emerging topic in audio digital signal processing due to the advance of low-cost, high-speed hardware that enables real-time processing by portable devices. Possible applications include intelligible sound in fast-forward play, real-time music manipulation, foreign language training, etc. Most time scale modification algorithms can be classified as either frequency-domain time scale modification or time-domain time scale modification. Frequency-domain time scale modification provides higher quality for polyphonic sounds, while time-domain time scale modification is more suitable for narrow-band signals such as voice. Time-domain time scale modification is the natural choice in resource-limited applications due to its lower computational cost.

A primitive time-domain time scale modification method known as overlap-and-add (OLA) overlaps and adds equidistant and equal-sized frames of the signal after changing the overlap factor to extend or reduce its time duration. A more sophisticated method known as synchronous overlap-and-add (SOLA) achieves considerable quality improvement by evaluating a normalized cross-correlation function between the overlapping signals for each overlap position to determine the exact overlap point. This process is called overlap adjustment loop. The synchronous overlap-and-add time scale modification method requires high computational resources for the cross-correlation and normalization processes. Several methods have been proposed to reduce the computational cost of the overlap adjustment loop of the synchronous overlap-and-add time scale modification method. These include: global-and-local search time scale modification (GLS-TSM) which limits the search to just a few candidates; and envelope-matching time scale modification (EM-TSM) which calculates the cross-correlation using only the sign of the signals.

SUMMARY OF THE INVENTION

This invention proposes a new time domain time scale modification method based on the synchronous overlap-and-add method. This invention is a generalization of the envelope matching time scale modification method. This invention employs a fixed-size cross-correlation buffer to eliminate the need for normalization inside the search loop. This fixed-size cross-correlation buffer is the center of the overlap region for the initial fine overlap. The computational cost of this invention is lower than any other method with comparable quality.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
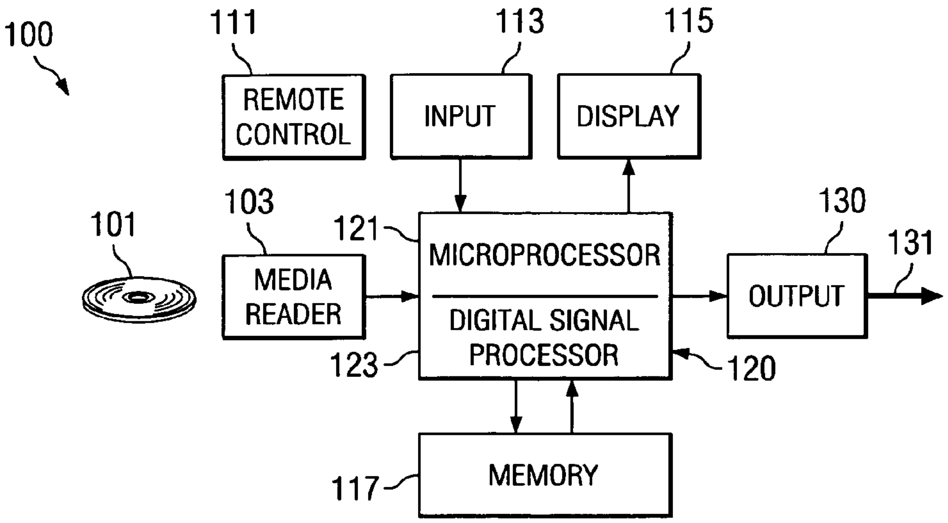
FIG. 1 illustrates a system to which the present invention is applicable.

FIG. 1 is a block diagram illustrating a system to which this invention is applicable. The preferred embodiment is a DVD player or DVD player/recorder in which the time scale modification of this invention is employed with fast forward or slow motion video to provide audio synchronized with the video in these modes.

System 100 received digital audio data on media 101 via media reader 103. In the preferred embodiment media 101 is a DVD optical disk and media reader 103 is the corresponding disk reader. It is feasible to apply this technique to other media and corresponding reader such as audio CDs, removable magnetic disks (i.e. floppy disk), memory cards or similar devices. Media reader 103 delivers digital data corresponding to the desired audio to processor 120.

Processor 120 performs data processing operations required of system 100 including the time scale modification of this invention. Processor 120 may include two different processors microprocessor 121 and digital signal processor 123. Microprocessor 121 is preferably employed for control functions such as data movement, responding to user input and generating user output. Digital signal processor 123 is preferably employed in data filtering and manipulation functions such as the time scale modification of this invention. A Texas Instruments digital signal processor from the TMS320C5000 family is suitable for this invention.

Processor 120 is connected to several peripheral devices. Processor 120 receives user inputs via input device 113. Input device 113 can be a keypad device, a set of push buttons or a receiver for input signals from remote control 111. Input device 113 receives user inputs which control the operation of system 100. Processor 120 produces outputs via display 115. Display 115 may be a set of LCD (liquid crystal display) or LED (light emitting diode) indicators or an LCD display screen. Display 115 provides user feedback regarding the current operating condition of system 100 and may also be used to produce prompts for operator inputs. As an alternative for the case where system 100 is a DVD player or player/recorder connectable to a video display, system 100 may generate a display output using the attached video display. Memory 117 preferably stores programs for control of microprocessor 121 and digital signal processor 123, constants needed during operation and intermediate data being manipulated. Memory 117 can take many forms such as read only memory, volatile read/write memory, nonvolatile read/write memory or magnetic memory, such as fixed or removable disks. Output 130 produces an output 131 of system 100. In the case of a DVD player or player/recorder, this output would be in the form of an audio/video signal such as a composite video signal, separate audio signals and video component signals and the like.

Figure 2:
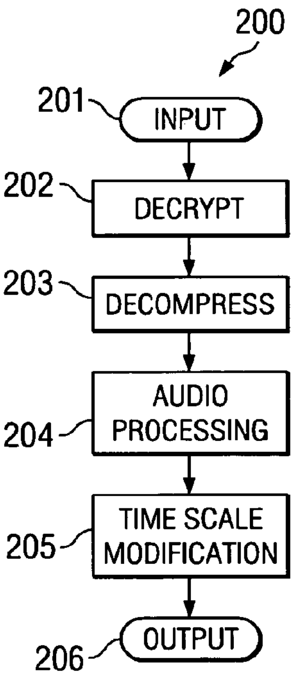
FIG. 2 is a flow chart illustrating the major functions of digital audio processing in the system illustrated in FIG. 1.

FIG. 2 is a flow chart illustrating process 203 including the major processing functions of system 100. Flow chart 200 begins with data input at input block 201. Data processing begins with an optional decryption function (block 202) to decode encrypted data delivered from media 101. Data encryption would typically be used for control of copying for theatrical movies delivered on DVD, for example. System 100 in conjunction with the data on media 101 determines if this is an authorized use and permits decryption if the use is authorized.

The next step is optional decompression (block 203). Data is often delivered in a compressed format to save memory space and transmit bandwidth. There are several motion picture data compression techniques proposed by the Motion Picture Experts Group (MPEG). These video compression standards typically include audio compression standards such as MPEG Layer 3 commonly known as MP3. There are other audio compression standards. The result of decompression for the purposes of this invention is a sampled data signal corresponding to the desired audio. Audio CDs typically directly store the sampled audio data and thus require no decompression.

The next step is audio processing (block 204). System 100 will typically include audio data processing other than the time scale modification of this invention. This might include band equalization filtering, conversion between the various surround sound formats and the like. This other audio processing is not relevant to this invention and will not be discussed further.

The next step is time scale modification (block 205). This time scale modification is the subject of this invention and various techniques of the prior art and of this invention will be described below in conjunction with FIGS. 3 to 6. Flow chart 200 ends with data output (block 206).

Figure 3A:
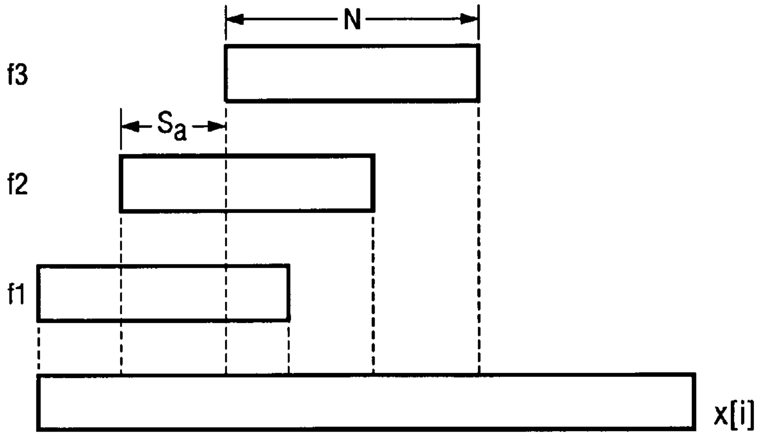
FIG. 3A (PRIOR ART)
FIG. 3 illustrates the overlap in the prior art overlap-and-add time-scale modification technique.
Figure 3B:
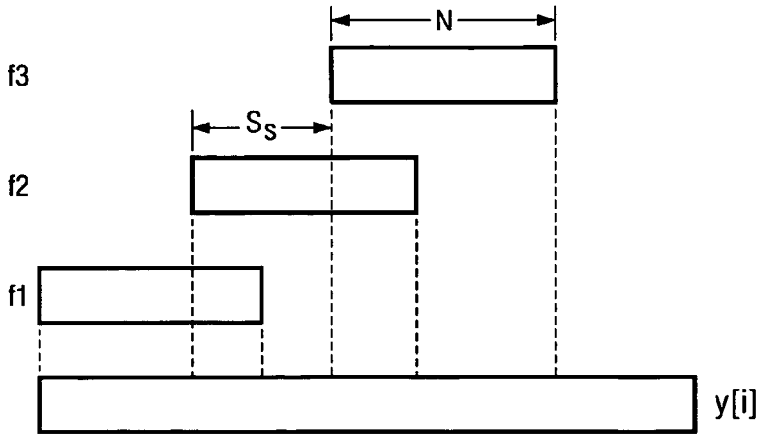
FIG. 3B (PRIOR ART)

FIG. 3 illustrates this process. In FIG. 3(*a*), x(i) is the analysis signals represented as a sequence with index i. Similarly, FIG. 3(*b*) illustrates synthesis signal y(i) having a sequence index i. The quantity N is the frame size. $S_a$ is the analysis frame interval between consecutive frames $f_1$ (where j=1, 2 . . . ). $S_s$ is the similar synthesis frame interval. The relationship between the analysis frame interval $S_a$ and the synthesis frame interval $S_s$ sets the time scale modification. The overlap-and-add time scale modification algorithm is simple and provides acceptable results for small time-scale factors. In general this method yields poor quality compared to other methods described below.

The synchronous overlap-and-add time scale modification algorithm is an improvement over the previous overlap-and-add approach. Instead of using a fixed overlap interval for synthesis, the overlap point is adjusted by computing the normalized cross-correlation between the overlapping regions for each possible overlap position within minimum and maximum deviation values. The overlap position of maximum cross-correlation is selected. The cross-correlation is calculated using the following formula, where $L_k$ is the length of the overlapping window:

$$R[k] = \frac{\sum_{i=0}^{L_k-1} y[mS_s+k+i]x[mS_a+i]}{\left[\sum_{i=0}^{L_k-1} y^2[mS_s+k+i]\sum_{i=0}^{L_k-1} x^2[mS_a+i]\right]^{1/2}} \quad (1)$$

Figure 4A:
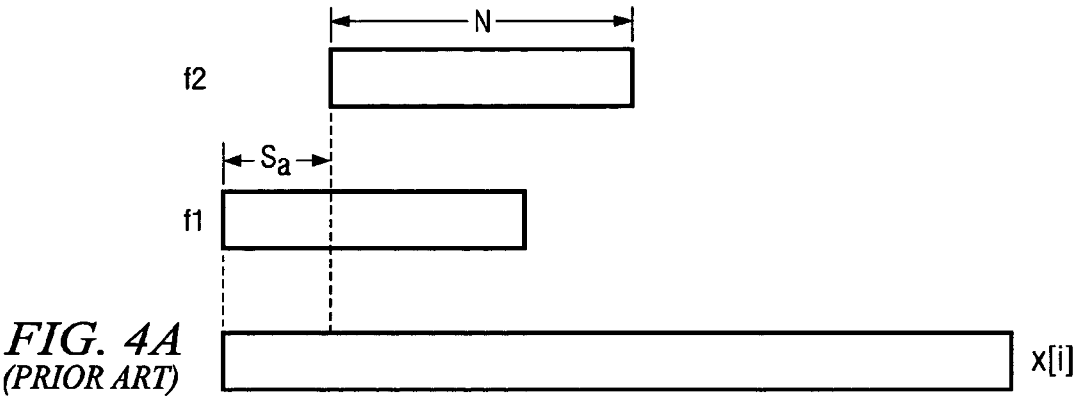
FIG. 4A (PRIOR ART)
FIG. 4 illustrates the overlap in the prior art synchronous overlap-and-add time-scale modification technique.
Figure 4B:
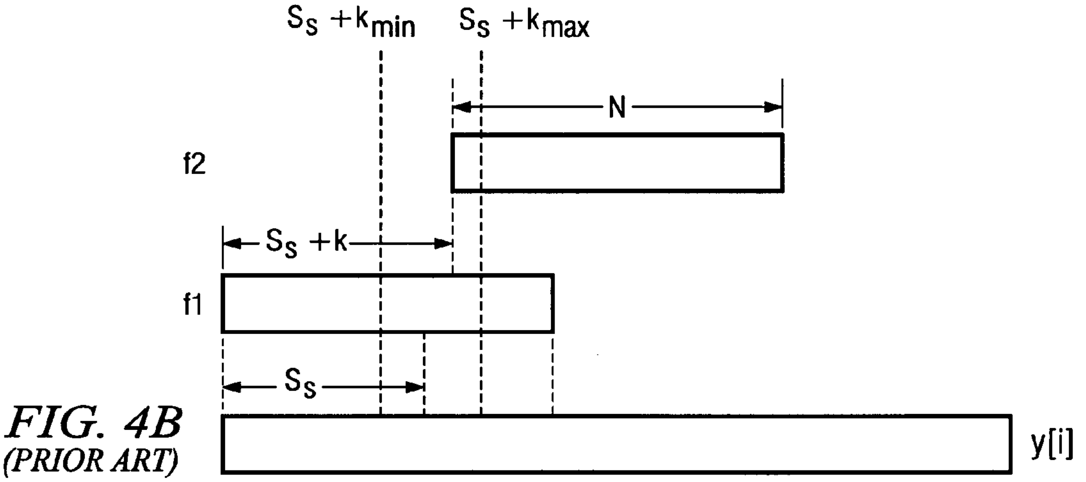
FIG. 4B (PRIOR ART)

FIG. 4 illustrates the synchronous overlap-and-add time scale modification algorithm. The same variables are used in FIG. 4(*a*) for analysis as FIG. 3(*a*) and used in FIG. 4(*b*) for synthesis as in 3(*b*). In FIG. 4, k is the deviation of the overlap position, with k limited to the range between $k_{min}$ and $k_{max}$. Note that k=0 is equivalent to the overlap-and-add time scale modification algorithm illustrated in FIGS. 3(*a*) and 3(*b*).

The synchronous overlap-and-add time scale modification algorithm requires a large amount of computation to calculate the normalized cross-correlation used in equation 1. The global-and-local search time scale modification method and envelope-matching time scale modification method are derived from the synchronous overlap-and-add time scale modification algorithm. These methods attempt to reduce the computation cost of the synchronous overlap-and-add time scale modification algorithm.

The global-and-local search time scale modification method uses global and local similarity measures to select the overlap point. Global similarity is the similarity around a region and local similarity is the similarity around a sample point. In a first global search stage, a region of high similarity between the signals is found by taking a region around the point of minimum difference between the numbers of zero crossings. In a second local search stage, each zero crossing within the region is tested using a distance measure and a feature vector formed by combining values of samples and their derivatives. The resulting algorithm provides better quality than the basic overlap-and-add time scale modification algorithm and requires lower computation than the synchronous overlap-and-add time scale modification algorithm and the envelope-matching time scale modification method described below. The limitation of global-and-local search time scale modification method lies in the global search based only on the zero-cross count and in the intrinsic difficulty of empirically designing an efficient feature vector for a large variety of input signals.

The envelope-matching time scale modification method represents an improvement over global-and-local search time scale modification. Rather than subdividing the search process into 2 phases, the amount of computation is reduced by modifying the original cross-correlation function of equation 1. The new cross-correlation function is described as:

$$R[k] = \frac{\sum_{i=0}^{L_k-1} \mathrm{sign}\{y[mS_s+i+k]\}\cdot \mathrm{sign}\{x[mS_a+i]\}}{L_k} \quad (2)$$

where:

$$\mathrm{sign}(t) = \begin{cases} 1, & \text{if } t \ge 0 \\ -1, & \text{if } t < 0 \end{cases}$$

The amount of computation in equation 2 is substantially reduced relative to equation 1 by eliminating the square root in the normalization process. Listening tests indicate that the quality achieved by the envelope-matching time scale modification method is better than global-and-local search time scale modification and almost as high as synchronous overlap-and-add. However, this technique does not provide the maximum achievable quality for the amount of computation required.

The computational cost of the division operation of equation 2 is another problem with this envelope-matching time scale modification technique. For example, the fastest implementation of 16-bit division in a digital signal processor may require at least 15 subtractions, a shift and perhaps one or two memory loads. For an example case where $k_{max}-k_{min}$ is 512, the normalization process would require 8192 processor cycles.

This invention proposes a simple solution to the computational problem related to the division operation executed inside the summation of equation 2. A typical implementation would place this division inside a software loop to be computed repeatedly. In this invention the size of the region where the cross-correlation function is to be calculated is fixed. Instead of calculating the cross-correlation function along the entire overlapping region, an effective overlap region of the input vector x[i] is defined as follows:

$$\text{initial\_x} \leq x[i] \leq \text{final\_x} \quad (3)$$

where:

$$\text{initial\_}x = \text{overlap\_size}/4,$$

$$\text{final\_}x = 3*\text{overlap\_size}/4$$

Figure 5:
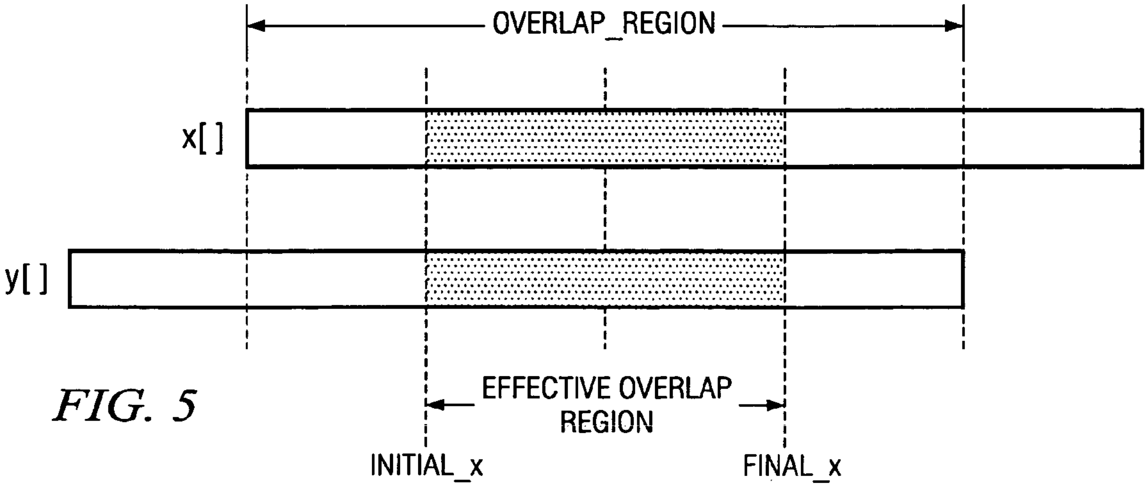
FIG. 5 illustrates calculation of cross-correlation for only the center of the overlap region according to this invention.

In equation 3, overlap_size is the number of samples of the overlapping region when k=0. FIG. 5 illustrates this effective overlap region. This limits the cross-correlation calculation region to the center half of the overlap region. Calculating the cross-correlation only in a fixed effective overlap region eliminates the need to normalize the cross-correlation result, since the cross-correlation values are calculated exclusively for comparison purposes, i.e., to find the overlap position that results in the maximum cross-correlation between the signals. This results in a considerable computational saving. Furthermore, computation is also reduced by about half due to the shorter size of the cross-correlation buffer, since the amount of computation is proportional to the size of the cross-correlation buffers. This computation is shown in equation 4.

$$R[k] = \sum_{i=initial\_x}^{final\_x} \text{sign}\{y[mS_s + i + k]\} \cdot \text{sign}\{x[mS_a + i]\} \quad (4)$$

Figure 6:
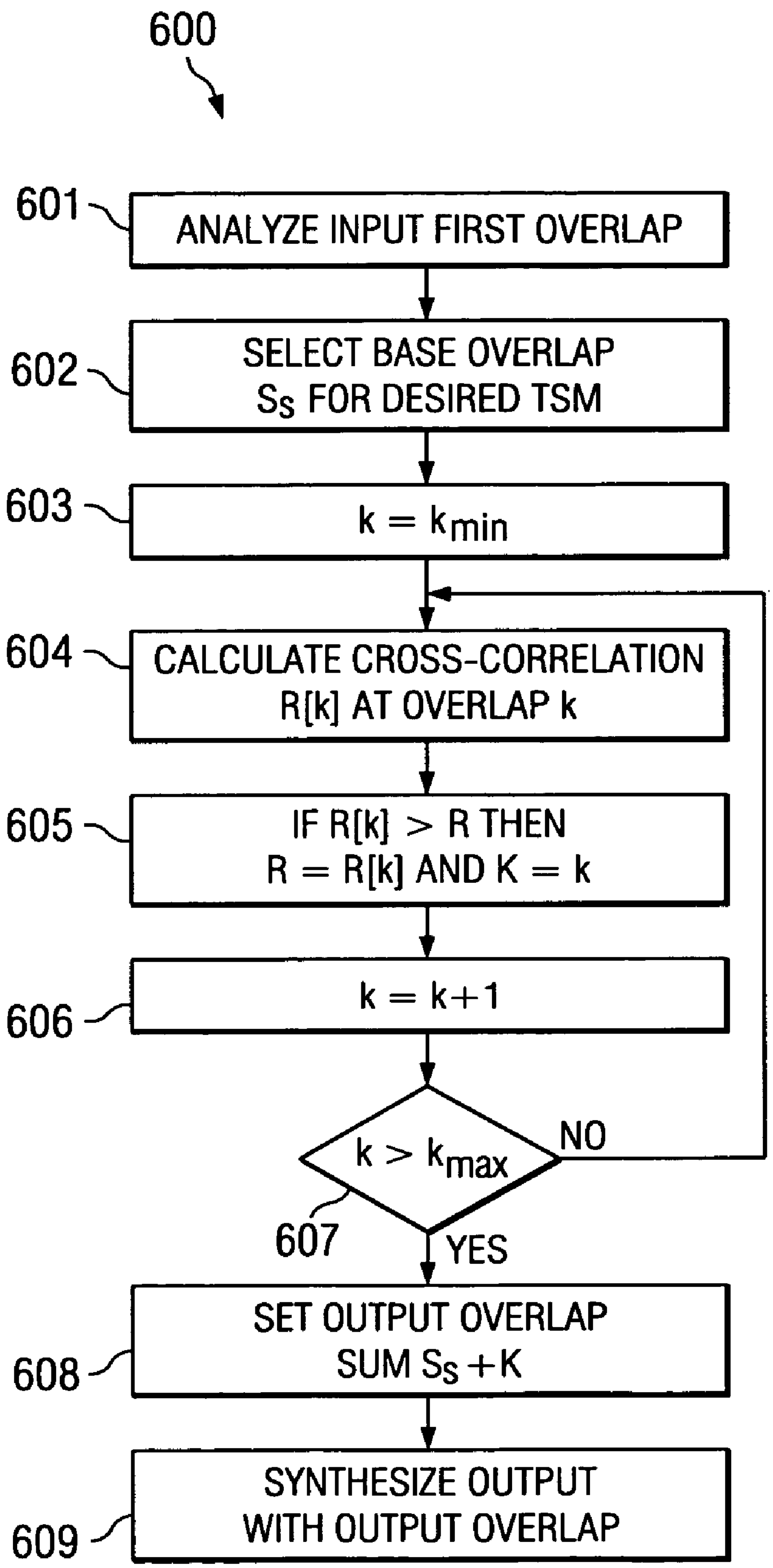
FIG. 6 is a flow chart illustrating the steps in this invention.

FIG. 6 illustrates process 600 showing the time scale modification of this invention. Process 600 begins by analyzing the input data in a series of equidistant and equally sized, overlapping frames as illustrated in FIG. 4(*a*) (block 601). Block 602 selects the base output overlap $S_s$ as shown in FIG. 4(*b*). This base output overlap is selected to achieve the desired time scale modification. Next process 600 computes a cross-correlation for various values of a fine overlap deviation k from $k_{min}$ to $k_{max}$. Block 603 sets an index variable k to $k_{min}$. Block 604 calculates the cross-correlation R[k] for that particular k using equation 4. As noted above, this cross-correlation calculation is made for only the middle half of the overlap region as illustrated in FIG. 5. Block 604 resets global variable R to the current cross-correlation R[k] if R[k] is greater than R. This captures the current maximum cross-correlation value. If the current cross-correlation R[k] is the new maximum, then the index value k is saved as K. Block 606 increments the index variable k. Test block 607 determines if the incremented index variable k is now greater than $k_{max}$. If not (No at block 607), the process 600 returns to block 604 to calculate the cross-correlation R[k] for the new index value. If true (Yes at block 607), then the entire range of k from $k_{min}$ to $k_{max}$ has been considered. Block 608 sets the output overlap as the sum of the base overlap $S_s$ and the saved index value K producing the greatest cross-correlation R[k]. Block 609 synthesizes the output using this computed overlap value.

Listening tests were conducted for three input sounds including female speech, male speech, and female speech with background music over a range of time scale modifications from twice normal to half normal speed. The quality achieved by this invention is indistinguishable from the prior art envelope-matching time scale modification, in spite of its lower computational cost.

What is claimed is:

1. A method of time scale modification of a digital audio signal comprising the steps of:

reading digital audio data from a data storage media;

employing a digital signal processor to analyze the digital audio data in a set of first equally spaced, overlapping time windows having a first overlap amount $S_a$;

select a base overlap $S_s$ for output synthesis corresponding to a desired time scale modification;

calculate a cross-correlation R[k] for index value k between overlapping frames for a range of overlaps between $S_s+k_{min}$ to $S_s+k_{max}$ for only a fixed length overlap region less than an entire overlapping region;

select a value K yielding the greatest cross-correlation value R[k];

synthesize an output signal in a set of second equally spaced, overlapping time windows having a second overlap amount equal to $S_s+K$; and producing an output corresponding to the output signal synthesized by the digital signal processor having the desired time scale modification relative to the digital audio data read from the storage media.

2. A method of time scale modification of a digital audio signal comprising the steps of:

reading digital audio data from a data storage media;

employing a digital signal processor to analyze the digital audio data in a set of first equally spaced, overlapping time windows having a first overlap amount $S_a$;

select a base overlap $S_s$ for output synthesis corresponding to a desired time scale modification;

calculate the cross-correlation R[k] for index value k between overlapping frames for a range of overlaps between $S_s+k_{min}$ to $S_s+k_{max}$ for only a fixed length overlap region less than an entire overlapping region employing the equation $$R[k] = \sum_{i=initial\_x}^{final\_x} \text{sign}\{y[mS_s + i + k]\} \cdot \text{sign}\{x[mS_a + i]\}.$$

where: x[i] is the analysis of the input signal for index value i; y[i] is a synthesis signal for the index value i;

select a value K yielding the greatest cross-correlation value R[k];

synthesize an output signal in a set of second equally spaced, overlapping time windows having a second overlap amount equal to $S_s+K$; and producing an output corresponding to the output signal synthesized by the digital signal processor having the desired time scale modification relative to the digital audio data read from the storage media.

3. The method of claim 1, wherein:

said step of calculating the cross-correlation R[k] employs only a center half of the overlap region for k=0.

4. A digital audio apparatus comprising:

a source of a digital audio signal;

a digital signal processor connected to said source of a digital audio signal programmed to perform time scale modification on the digital audio signal by analyzing an input signal in a set of first equally spaced, overlapping time windows having a first overlap amount, selecting a base overlap $S_s$ for output synthesis corresponding to a desired time scale modification, calculating a cross-correlation R[k] for index value k between overlapping frames for a range of overlaps between $S_s+k_{min}$ to $S_s+k_{max}$ for only a fixed length overlap region less than an entire overlapping region;

selecting a value K yielding the greatest cross-correlation value R[k], synthesizing an output signal in a set of second equally spaced, overlapping time windows having a second overlap amount equal to $S_s$+K; and an output device connected to the digital signal processor for outputting the time scale modified digital audio signal.

5. A digital audio apparatus comprising:

a source of a digital audio signal;

a digital signal processor connected to said source of a digital audio signal programmed to perform time scale modification on the digital audio signal by analyzing an input signal in a set of first equally spaced, overlapping time windows having a first overlap amount, selecting a base overlap $S_s$ for output synthesis corresponding to a desired time scale modification, calculating a cross-correlation R[k] for index value k between overlapping frames for a range of overlaps between $S_s+k_{min}$ to $S_s+k_{max}$ for only a fixed length overlap region less than an entire overlapping region employing the equation $$R[k] = \sum_{i=initial\_x}^{final\_x} \mathrm{sign}\{y[mS_s + i + k]\} \cdot \mathrm{sign}\{x[mS_a + i]\}.$$

where: x[i] is the analysis of the input signal for index value i; y[i] is a synthesis signal for the index value i, selecting a value K yielding the greatest cross-correlation value R[k], synthesizing an output signal in a set of second equally spaced, overlapping time windows having a second overlap amount equal to $S_s$+K; and an output device connected to the digital signal processor for outputting the time scale modified digital audio signal.

6. The digital audio apparatus of claim 4, wherein:

said digital signal processor is programmed to calculate the cross-correlation R[k] employing only a center half of the overlap region for k=0.

* * * * *

UNITED STATES PATENT AND TRADEMARK OFFICE

CERTIFICATE OF CORRECTION

PATENT NO. : 7,580,761 B2
APPLICATION NO. : 10/714175
DATED : August 25, 2009
INVENTOR(S) : Sakurai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1682 days.

Signed and Sealed this

Fourteenth Day of September, 2010

David J. Kappos

*Director of the United States Patent and Trademark Office*